United States Patent
Pietron et al.

(10) Patent No.: US 10,651,478 B2
(45) Date of Patent: May 12, 2020

(54) ELECTRODES HAVING PT NANOPARTICLES ON RUO$_2$ NANOSKINS

(71) Applicants: Jeremy J Pietron, Washington, DC (US); Michael B. Pomfret, Washington, DC (US); Christopher N. Chervin, Washington, DC (US); Debra R Rolison, Arlington, VA (US); Jeffrey W Long, Alexandria, VA (US)

(72) Inventors: Jeremy J Pietron, Washington, DC (US); Michael B. Pomfret, Washington, DC (US); Christopher N. Chervin, Washington, DC (US); Debra R Rolison, Arlington, VA (US); Jeffrey W Long, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 1418 days.

(21) Appl. No.: 13/723,878

(22) Filed: Dec. 21, 2012

(65) Prior Publication Data

US 2013/0122401 A1    May 16, 2013

Related U.S. Application Data

(63) Continuation-in-part of application No. 12/245,978, filed on Oct. 6, 2008, now Pat. No. 8,889,257, and a
(Continued)

(51) Int. Cl.
*H01M 4/88* (2006.01)
*H01M 8/08* (2016.01)
(Continued)

(52) U.S. Cl.
CPC ....... *H01M 4/8853* (2013.01); *C23C 18/1216* (2013.01); *C23C 18/1225* (2013.01);
(Continued)

(58) Field of Classification Search
CPC ........ H01M 4/8853; H01M 4/92; H01M 8/08; H01M 4/925
(Continued)

(56) References Cited

U.S. PATENT DOCUMENTS

| | | |
|---|---|---|
| 6,060,154 A | 5/2000 | Adachi et al. |
| 6,670,301 B2 | 12/2003 | Adzic et al. |

(Continued)

FOREIGN PATENT DOCUMENTS

JP    2003187643 A    7/2003

OTHER PUBLICATIONS

Merriam Webster Definition of Homogeneous; Oct. 2016.*
(Continued)

*Primary Examiner* — Jennifer A Chriss
*Assistant Examiner* — Ricardo E Lopez
(74) *Attorney, Agent, or Firm* — US Naval Research Laboratory; Joseph Grunkemeyer

(57) ABSTRACT

An article having a titanium, titanium carbide, titanium nitride, tantalum, aluminum, silicon, or stainless steel substrate, a RuO$_2$ coating on a portion of the substrate; and a plurality of platinum nanoparticles on the RuO$_2$ coating. The RuO$_2$ coating contains nanoparticles of RuO$_2$. A method of: immersing the substrate in a solution of RuO$_4$ and a nonpolar solvent at a temperature that is below the temperature at which RuO$_4$ decomposes to RuO$_2$ in the nonpolar solvent in the presence of the article; warming the article and solution to ambient temperature under ambient conditions to cause the formation of a RuO$_2$ coating on a portion of the article;
(Continued)

and electrodepositing platinum nanoparticles on the $RuO_2$ coating.

20 Claims, 7 Drawing Sheets

Related U.S. Application Data continuation-in-part of application No. 12/954,800, filed on Nov. 26, 2010, now Pat. No. 8,906,501, which is a continuation-in-part of application No. 12/245,978, filed on Oct. 6, 2008, now Pat. No. 8,889,257.

(60) Provisional application No. 60/977,685, filed on Oct. 5, 2007, provisional application No. 61/264,967, filed on Nov. 30, 2009, provisional application No. 61/578,321, filed on Dec. 21, 2011.

(51) Int. Cl.
| | |
|---|---|
| H01M 4/92 | (2006.01) |
| C23C 18/12 | (2006.01) |
| C25D 5/34 | (2006.01) |
| C25D 15/00 | (2006.01) |
| H01M 8/1011 | (2016.01) |
| H01M 8/0236 | (2016.01) |
| H01M 4/13 | (2010.01) |

(52) U.S. Cl.
CPC ............ *C23C 18/1295* (2013.01); *C25D 5/34* (2013.01); *C25D 15/00* (2013.01); *H01M 4/92* (2013.01); *H01M 4/925* (2013.01); *H01M 8/08* (2013.01); *H01M 8/1011* (2013.01); *H01M 4/13* (2013.01); *H01M 8/0236* (2013.01); *Y02E 60/523* (2013.01)

(58) Field of Classification Search
USPC .................................................. 429/506–534
See application file for complete search history.

(56) References Cited

U.S. PATENT DOCUMENTS

| | | | | |
|---|---|---|---|---|
| 8,889,257 | B2 | 11/2014 | Rolison et al. | |
| 2006/0198082 | A1* | 9/2006 | Eberhard | H01G 9/04 |
| | | | | 361/516 |
| 2007/0059584 | A1* | 3/2007 | Nakano | C25D 1/00 |
| | | | | 429/483 |
| 2008/0251390 | A1* | 10/2008 | Tsai | C25D 3/567 |
| | | | | 205/257 |
| 2009/0092834 | A1 | 4/2009 | Rolison et al. | |
| 2009/0269667 | A1 | 10/2009 | Antonietti et al. | |
| 2013/0122401 | A1 | 5/2013 | Pietron et al. | |

OTHER PUBLICATIONS

Chervin et al., "Effect of temperature and atmosphere on the conductivity and electrochemical capacitance of single-unit-thick ruthenium dioxide" J. Electroanal. Chem. 644 (2010) 155-163.
Godoi et al., "Effects of Alloyed and Oxide Phases on Methanol Oxidation of Pt-Ru/C Nanocatalysts of the Same Particle Size" J. Phys. Chem. C 2009, 113, 8518-8525.
Li et al., "Catalytic oxidation of methanol on molybdate-modified platinum electrode in sulfuric acid solution" J. Power Sources 104 (2002) 281-288.
Long et al., "How to Make Electrocatalysts More Active for Direct Methanol OxidationsAvoid PtRu Bimetallic Alloys!" J. Phys. Chem. B 2000, 104, 9772-9776.
Park et al., "Electrocatalytic Enhancement of Methanol Oxidation at Pt-WOx Nanophase Electrodes and In-Situ Observation of Hydrogen Spillover Using Electrochromism" J. Phys. Chem. B 2003, 107, 4352-4355.
Penner, "Mesoscopic Metal Particles and Wires by Electrodeposition" J. Phys. Chem. B 2002, 106, 3339-3353.
Pietron et al., "Direct methanol oxidation at low overpotentials using Pt nanoparticles electrodeposited at ultrathin conductive $RuO_2$ nanoskins" J. Mater. Chem., 2012, 22, 5197.
Profeti et al., "Pt-RuO2 electrodes prepared by thermal decomposition of polymeric precursors as catalysts for direct methanol fuel cell applications." Int. J Hydrogen Energy 34 (2009) 2747-2757.
Rolison et al., "Role of Hydrous Ruthenium Oxide in Pt-Ru Direct Methanol Fuel Cell Anode Electrocatalysts: The Importance of Mixed Electron/Proton Conductivity" Langmuir 1999, 15, 774-779.
Shen et al., "CO Oxidataion on Pt-Ru/WO3 Electrodes" J. Electrochem. Soc. 142 (1995) L85-L86.
Shukla et al., "Methanol electrooxidation on carbon-supported Pt-WO3-x electrodes in sulphuric acid electrolyte" J. Appl. Electrochem. 25 (1995)528-532.
Suffredini et al., "Sol-gel method to prepare active Pt-RuO2 coatings on carbon powder for methanol oxidation" Electrochemistry Communications 6 (2004) 1025-1028.
Suffredini et al., "Electro-oxidation of methanol and ethanol using a Pt-RuO2/C composite prepared by the sol-gel technique and supported on boron-doped diamond" Journal of Power Sources 158 (2006) 124-128.
Villullas et al., "Electrochemical Oxidation of Methanol on Pt Nanoparticles Dispersed on RuO2" J. Phys. Chem. B 2004, 108, 12898-12903.
Villullas et al., "Sol-Gel Prepared Pt-Modified Oxide Layers: Synthesis, Characterization, and Electrocatalytic Activity" Chem. Mater 2006, 18, 5563-5570.
Zhang et al., "Electrochemically Codeposited Platinum/Molybdenum Oxide Electrode for Catalytic Oxidation of Methanol in Acid Solution" Electrochemical and Solid-State Letters, 2 (9) 437-439 (1999).
Panić et al., "The properties of electroactive ruthenium oxide coatings supported by titanium-based ternary carbides" Surface & Coatings Technology 202 (2007) 319-324.
Ouattara et al., "Dimensionally Stable Anode-Type Anode Based on Conductive p-Silicon Substrate" J. Electrochem. Soc. 150 (2003) D41-D45.
Jovic et al., "Corrosion Behavior and Passive Film Characteristics Formed on Ti, Ti3SiC2 , and Ti4AlN3 in H2SO4 and HCl" Journal of the Electrochemical Society, 151 (2) B71-B76 (2004).
Katsuki et al., "Water Electrolysis Using Diamond Thin-Film Electrodes" J. Electrochem. Soc. 1998, vol. 145, Issue 7, pp. 2358-2362.
Brungs et al., "Preparation and evaluation of electrocatalytic oxide coatings on conductive carbon-polymer composite substrates for use as dimensionally stable anodes" J. Appl. Electrochem. 26 (1998) 1117-1123.
Extended European Search Report in EP 10834002.7 (dated Jan. 22, 2015).
Office Action in JP2012-541217 (Jun. 28, 2016).
Office Action in KR2012-7007425 (dated Sep. 6, 2016).

\* cited by examiner

ELECTRODES HAVING PT NANOPARTICLES ON RUO₂ NANOSKINS

This application claims the benefit of U.S. Provisional Application No. 61/578,321, filed on Dec. 21, 2011. This application is a continuation-in-part application of U.S. patent application Ser. No. 12/245,978, filed on Oct. 6, 2008, which claims the benefit of U.S. Provisional Application No. 60/977,685, filed on Oct. 5, 2007. This application is a continuation-in-part application of U.S. patent application Ser. No. 12/954,800, filed on Nov. 26, 2010, which claims the benefit of U.S. Provisional Application No. 61/264,967, filed on Nov. 30, 2009. These applications and all other publications and patent documents referred to throughout this nonprovisional application are incorporated herein by reference.

TECHNICAL FIELD

The present disclosure is generally related to fuel-cell anodes.

DESCRIPTION OF RELATED ART

Chervin et al. recently developed a protocol for electroless deposition of conformal, nanoparticulate coatings of $RuO_2$—dubbed $RuO_2$ nanoskins—that are extremely thin (at 2-3-nm they are essentially the thickness of a single unit-cell of rutile $RuO_2$) (Chervin et al., *Nano Lett.* 9 (2009) 2316-2321; Chervin et al., *J. Electroanal. Chem.* 644 (2010) 155-163). The $RuO_2$ nanoskins are more conductive than polycrystalline $RuO_2$, even when deposited on electron insulators, and yet still feature electrochemical pseudocapacitance characteristic of hydrous ruthenium oxides (Chervin, *Nano Lett*; Chervin, *J. Electroanal. Chem*). The combined high electronic conductivity and hydrous-mimicking character of $RuO_2$ nanoskins suggest that they should be good supports for platinum (Pt) nanoparticle electrocatalysts for direct methanol ($CH_3OH$) oxidation (Rolison et al., *Langmuir* 15 (1998) 774-779; Rolison et al., Extended Abstr. 207th Natl. Meeting ECS, 15-20 May 2005, Quebec City, Quebec, Canada, Abstr. #1554). The electronic conductivity of the ruthenia skin assures good electronic connection between the catalyst and current collector, while hydration of the anhydrous oxide via chemisorption of $H_2O$ from the vapor or liquid phase creates the hydroxylated speciation critical to the bifunctional mechanism of electrochemical methanol oxidation whereby Ru—OH activates water to oxidize CO-related species adsorbed at Pt (Rolison, *Langmuir*; Gasteiger et al., *J. Phys. Chem.* 97 (1993) 12020-12029; Long et al., *J. Phys. Chem. B* 104 (2000) 9772-9776).

The importance of hydrated $RuO_2$ in the activation of Pt electrocatalysts for direct methanol oxidation was demonstrated by Rolison and coworkers when they proved that the most active form of nanoscale, bimetallic PtRu is not the $Pt_\alpha Ru_\alpha$ alloy, but a physicochemically complex, phase-separated mix of a metallic Pt core carpeted by hydrous ruthenium oxide, with some platinum oxides present and very little if any part being played by metallic ruthenium (Rolison, *Langmuir*; Long, *J. Phys. Chem. B*; Stroud et al., *Microscopy Microanal.* 8 (2002) 50-57). Subsequently, Villullas et al. (*J. Phys. Chem. B* 108 (2004) 12898-12903; *Chem. Mater.* 18 (2006) 5563-5570) and Suffredini et al. (*Electrochem. Commun.* 6 (2004) 1025-1028) showed that sol-gel-derived $RuO_2$ activates the electrocatalytic oxidation of $CH_3OH$ at Pt nanoparticles (2-4 nm), while Profeti et al. (*Int. J. Hyd. Energy* 34 (2009) 2747-2757) demonstrated similar activating effects for $RuO_2$ derived from polymeric precursors that featured a hydrated form of rutile $RuO_2$. The common thread among these forms of $RuO_2$ is that they all are hydrous or water-sorbing oxides, and are thus water-activating support materials.

BRIEF SUMMARY

Disclosed herein is an article comprising: a substrate comprising titanium, a titanium carbide, a titanium nitride, tantalum, aluminum, silicon, or stainless steel, a $RuO_2$ coating on a portion of the substrate; and a plurality of platinum nanoparticles on the $RuO_2$ coating. The $RuO_2$ coating comprises nanoparticles of $RuO_2$.

Also disclosed herein is a method comprising: immersing a substrate comprising titanium in a solution of $RuO_4$ and a nonpolar solvent at a temperature that is below the temperature at which $RuO_4$ decomposes to $RuO_2$ in the nonpolar solvent in the presence of the article; warming the article and solution to ambient temperature under ambient conditions to cause the formation of a $RuO_2$ coating on a portion of the article; and electrodepositing platinum nanoparticles on the $RuO_2$ coating.

BRIEF DESCRIPTION OF THE DRAWINGS

A more complete appreciation will be readily obtained by reference to the following Description of the Example Embodiments and the accompanying drawings.

Figure 1:
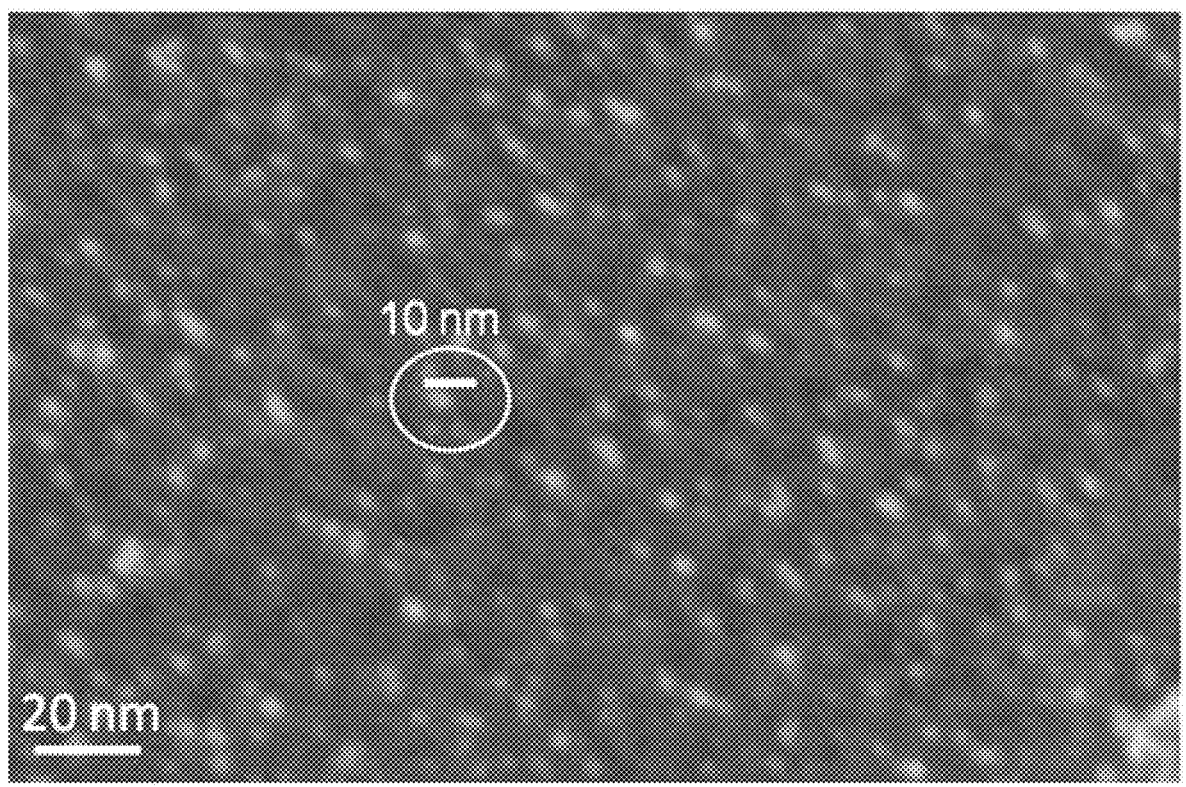
FIG. 1 shows a scanning electron micrograph of a Pt/RuO₂(Ti) foil; the circled region highlights the bimodal size distribution of the electrodeposited Pt nanoparticles with examples of smaller (~2-nm) and larger (~5-nm) particles present.

(Ti): (a) $RuO_2(Ti)$ (●●●) and $Pt/RuO_2(Ti)$ in 0.5 M $CH_3OH/0.1$ M $HClO_4$ (-), and $Pt/RuO_2(Ti)$ in 0.1 M $HClO_4$ only (- - -), 10 mV s$^{-1}$; (b) Cyclic voltammetric data for $Pt/RuO_2(Ti)$ in 0.5 M $CH_3OH/0.1$ M $HClO_4$ with the data for $Pt/RuO_2(Ti)$ in $HClO_4$ subtracted. The current densities are normalized to the geometric surface areas of the foils.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a demonstration of the following: (i) electrodeposition of small (primarily 2-4 nm) Pt nanoparticles at $RuO_2$ nanoskins electrolessly deposited at Ti foils; (ii) the means for determining the electrochemical surface area of Pt nanoparticles when supported on an ultrathin conducting oxide with extremely high electrochemical capacitance; (iii) the means for establishing the electrocatalytic activity of Pt nanoparticles when supported on an ultrathin conducting oxide with extremely high electrochemical capacitance; and (iv) the activation of Pt nanoparticles for electrocatalytic $CH_3OH$ oxidation by intimate intermingling of the metal with the nanometric $RuO_2$ particles that comprise the nanoskin. The results highlight the opportunities and concerns that await expression of this model 2D catalytic electroanalytical structure as high-surface-area practical electrode architectures, such as those used in electrolyzers and direct methanol fuel cells.

Small (primarily 2-4 nm) Pt nanoparticles electrodeposited at Ti-supported $RuO_2$ nanoskins, designated as $Pt/RuO_2$ (Ti), can be highly active for electrocatalytic oxidation of methanol ($CH_3OH$) in acid electrolyte, with peak potentials among the lowest reported anywhere for $RuO_2$-supported Pt. The Pt-modified $RuO_2$ nanoskin may be equally effective for MeOH oxidation whether one or both sides of the Ti-foil substrate is coated or whether the $RuO_2$ nanoskin is electrolessly deposited at the Ti substrate as a single layer or in multiple layers. Current densities for methanol oxidation are ~2× lower than previously reported, owing to a bimodal distribution of both highly active (2-4 nm) and less active larger (>5 nm) Pt particles. The methods reported here comprise a means of expressing highly active, nanostructured bifunctional electrocatalytic coatings on substrates of essentially any geometry and minimizing the quantity of $RuO_2$ necessary.

Further refinement of deposition times and better control of the initial condition of the $RuO_2$ films (e.g., using plasma cleaning or strong acid treatments to eliminate organic impurities on the $RuO_2$ surface) should mitigate deposition of larger, less active Pt nanoparticles and improve current density at low overpotentials. Alternately, preformed 2-3-nm Pt nanoparticles could be deposited at the $RuO_2$ nanoskins either electrophoretically by adapting the methods developed by Teranishi et al. (*J. Phys. Chem. B* 103 (1999), 3818-3827) or anodically by adapting the methods developed by Despić and Pavlović (*J. Electroanal. Chem.* 180 (1984), 31-40).

The substrate may be any article having a surface comprising titanium, a titanium carbide (including $Ti_3SiC$), a titanium nitride (including $Ti_4AlN_3$), tantalum, aluminum, silicon, or stainless steel. (Any description throughout this application of a titanium substrate is applicable to substrate of the other listed materials.) The substrate or its surface may comprise, for example, at least 10, 50, 90, or 99 wt % Ti, or may be effectively pure Ti metal. The substrate may be any shape that allows the surface to be immersed in the solutions for depositing the ruthenia and platinum. Suitable substrates include, but are not limited to, a planar substrate and a mesh.

The ruthenia may be deposited, for example, according the methods disclosed in Ryan et al. (*Nature* 406 (2000) 169-172); Chervin et al., *Nano Lett*; Chervin, *J. Electroanal. Chem*; and US Patent Application Publication Nos. 2009/0092834 and 2011/0091723. $RuO_2$ may be deposited by immersing the substrate in a solution of $RuO_4$ and a nonpolar solvent. The immersion is done at a temperature that avoids decomposition of $RuO_4$ in that solvent in the presence of the article. As $RuO_4$ may decompose at room temperature in solvents, the immersion may be cooled by a dry ice bath (about −78° C.) or in an aqueous ice bath (about 0° C.). The immersion may continue until the entire surface of the substrate or a sufficient amount of the surface of the substrate is wet with the solution.

Before the immersion, it may be desirable to equilibrate the substrate in the nonpolar solvent without the presence of $RuO_4$. This step is performed at the same temperature as the immersion. By this method, the substrate is at the same temperature as the $RuO_4$ solution when it first contacts the substrate.

Once the immersion is complete, the substrate and solution are warmed to ambient temperature under ambient conditions. Ambient temperature includes, but is not limited to, room temperature, about 25° C., about 20 to about 30° C., and temperatures typically occurring in laboratory and manufacturing facilities with or without climate control. The warming may occur under ambient conditions, meaning that the warming need not be slowed by maintaining any cooling of the solution, nor hastened by direct heating of the solution by anything other than ambient air or objects in contact with the solution, substrate, or vessel containing them.

Suitable nonpolar solvents include, but are not limited to, a hydrocarbon solvent or mixture of hydrocarbon solvents such as petroleum ether. The solvent may be resistant to oxidation by $RuO_4$ and may be free of heteroatoms that may cause nucleation and growth of $RuO_2$ precipitates instead of coating the article.

The $RuO_4$ may be obtained in an aqueous solution, where it may be more stable than in a nonpolar solution. In that case, the $RuO_4$ may be extracted into the nonpolar solvent before immersing the substrate.

This process produces a $RuO_2$ coating on a portion of the substrate, which may include the entire substrate. The coating may cover enough of the substrate such that the $RuO_2$ forms an electrically connected network throughout the coated portion and introduces electronic and ionic transport functionality while minimizing the quantity of $RuO_2$ necessary. The network has the effect of increasing the bulk electrical conductivity of the article. The coating may have an average thickness of up to about 10 nm. This average thickness does not include non-coated portions of the substrate. The thickness and $RuO_2$ loading may be adjusted to tune the electrical properties of the substrate. As used herein "$RuO_2$" and "ruthenia" may include hydrated or hydrous and non-hydrous forms, and a non-hydrous form may have similar electrochemcal behavior as a hydrous form.

After deposition of $RuO_2$, the substrate may be heated to improve the conductive properties of the coating and to influence the degree of order and thus crystallinity of the $RuO_2$ nanoskin. Disordered $RuO_2$ may be formed, for example, at 150° C. to 250° C. Heating to higher temperatures may produce X-ray-diffraction-observable rutile $RuO_2$, which may have a lower conductivity in such a thin coating. The particles may separate from each other during thermal ripening at temperatures greater than 250° C., causing a loss of electrical connectivity within the coating. The heating may be performed in, for example, oxygen or air.

The $RuO_2$ may be, for example, no more than 10-nm thick. A single layer made by the method disclosed herein may be only 2-3 nm thick. The process may be repeated multiple times to produce a thicker layer.

The platinum nanoparticles may be deposited by electrodeposition, which may be by immersing the substrate in a solution containing platinum cations and reducing the platinum to metal. The electrodeposition may be tuned to produce Pt nanoparticles having an average diameter of less than about 5 nm. This process produces separate particles of ruthenia and platinum without intermixing of the metals, while still allowing for a high degree of contact between the metals.

The Pt/$RuO_2$(Ti) composite may be used as an anode in a fuel cell, including direct methanol fuel cells. Such a fuel cell includes a suitable cathode and other components that are known in the art of fuel cells. In a direct methanol fuel cell, methanol is oxidized at the surface of the anode. Proposed chemical reactions are described below.

The flexibility of the electroless $RuO_2$ deposition process, combined with electrodeposition protocols that yield active nanometric Pt, allows assembly of multicomponent catalytic systems with considerable geometric design flexibility to fabricate electrode architectures in technologically relevant form factors (Chervin, *Nano Lett*; Long et al., *Acc. Chem. Res.* 40 (2007) 854-862; Rolison et al., *Chem. Soc. Rev.* 38 (2009) 226-252). For example, the mixed proton/electron-conducting character of $RuO_2$ nanoskins (Chervin, *Nano Lett*; Chervin, *J. Electroanal. Chem*) makes them viable candidates as carbon-free, ionomer-free supports for DMFC fuel cell catalysts (Rolison et al., Extended Abstr. 207th Natl. Meeting ECS); such attributes simultaneously simplify anode design and eliminate the problem of carbon corrosion inherent to carbon-supported DMFC catalysts and proton exchange membrane fuel cell catalysts (Antolini et al., *J. Mater. Sci.* 46 (2011) 4435-4457; Maass et al., *J. Power Sources* 176 (2008) 444-451; Reiser et al., *Electrochem. Solid-State Lett.* 8 (2005) A273-A276; Kangasniemi et al., *J. Electrochem. Soc.* 151 (2004) E125-E132; Taniguchi et al., *J. Power Sources* 130 (2004) 42-49; Korovin, *Electrochim. Acta* 39 (1994) 1503-1508). Further, the atom-efficient protocol of Chervin et al. (*Nano Lett.*) limits the quanity of the expensive platinum-group metal Ru necessary to provide proton/electron-conducting character.

The following examples are given to illustrate specific applications. These specific examples are not intended to limit the scope of the disclosure in this application.

Example 1

Reagents

Chloroplatinic acid hexahydrate ($H_2PtCl_6 \cdot 6H_2O$, Sigma-Aldrich), sodium sulfate ($Na_2SO_4$, ≥99%, Sigma-Aldrich), perchloric acid ($HClO_4$, 70%, double-distilled, GFS Chemicals), sulfuric acid ($H_2SO_4$, 99.999%, Sigma-Aldrich), methanol ($CH_3OH$, 99.9%, Fisher Scientific), copper sulfate ($CuSO_4$, 98%, Alfa Aesar), ultrahigh purity argon (Ar, Praxair), carbon monoxide (CO, 99.999%, AGT), petroleum ether (Fisher Scientific, certified ACS), and ruthenium tetroxide ($RuO_4$, 0.5% aqueous solution, Strem Chemicals) were used as received. Titanium foils (0.25-mm-thick, 99.5%, Alfa Aesar) were rinsed and then sonicated for 15 min in acetone (Warner-Graham Company), followed by drying at 120° C. in air for at least 1 h before coating with nanometric ruthenium oxide ($RuO_2$) as described below.

Example 2

Electroless Deposition of $RuO_2$ Nanoskins onto Ti Foils and Electrodeposition of 2-4-nm Pt Nanoparticles at $RuO_2$(Ti) Electrodes Ruthenia-coated titanium foils ($RuO_2$(Ti)) were prepared by deposition at sub-ambient temperature in a manner adapted from the protocol described previously for coating silica fiber papers (Chervin, *Nano Lett.*; Chervin, *J. Electroanal. Chem.*) to 0.25-mm-thick titanium foils cut to dimensions of ~1.5 cm×(2.5-5) cm (both shorter and longer foils were produced). Briefly, aqueous $RuO_4$ was extracted into chilled petroleum ether (at ~−78° C.) and then collected in a vial containing ~100 mg of $MgSO_4$ to remove excess water, passed through a coarse filter, and temporarily stored in a flask held in a dry ice-acetone bath. The chilled nonaqueous $RuO_4$ solution was then introduced to a glass-staining jar that contained the Ti substrates maintained in an upright position, and the jar was covered and warmed to room temperature under ambient conditions. As the solution warmed, $RuO_4$ decomposed to $RuO_2$ and $O_2$ depositing a nanoscale film of the $RuO_2$ onto the surfaces of the Ti foil. The $RuO_2$(Ti) electrodes were heated for 4 h in air in a furnace (Thermolyne) at 150° C.

A procedure described by Penner et al. (*J. Phys. Chem. B* 106 (2002) 3339-3354) was adapted to deposit Pt particles smaller than ~5-nm in diameter, thus maximizing interfacial contact between the Pt particles and their nanometric $RuO_2$ support. Platinum (Pt) nanoparticles were deposited at $RuO_2$(Ti) electrodes by immersing the electrodes into 3 mM $H_2PtCl_6$/0.5 M $Na_2SO_4$ while maintaining the electrode at a non-Pt-depositing potential of 1.15 V vs. reversible hydrogen electrode (RHE; the cell was controlled with a Bioanalytical Systems Ag/AgCl reference electrode; all potentials are reported as corrected to the RHE potential); Pt gauze served as the counter electrode. Electrode potentials were applied using a Gamry Reference 3000 Potentiostat controlled with a PC and Gamry Framework software or with a Pine Instruments AFCBP1 Bipotentiostat controlled with Pinechem™ software. A potential step to −0.8 V vs. RHE was applied for 20 s, after which the potential was stepped to 1.15 V. The Pt nanoparticle-coated electrode (Pt/$RuO_2$(Ti)) was emersed from the deposition solution at 1.15 V, immediately rinsed with copious amounts of water (18 MΩ·cm, Barnstead Nanopure), and dried in air. When coating $RuO_2$(Ti) electrodes with Pt nanoparticles on only one side, the side that was to remain Pt-free was masked with Fluorglass™ tape (Saint-Gobain) before performing the electrodeposition step.

Because the electrochemical pseudocapacitance of hydrated RuOx species is so high—as much as 720 F $g^{-1}$ for $RuO_2 \cdot 0.5H_2O$ (Zheng et al., *J. Electrochem. Soc.* 142 (1995) 2699-2703; Jow et al., *J. Electrochem. Soc.* 145 (1998) 49-52) and >800 F $g_{(RuO_2)}^{-1}$ for $RuO_2$ nanoskins in aqueous acid (Chervin et al., *J. Electroanal. Chem.*)—substantial time is required to charge the electrical double layer and pseudocapacitance of hydrated $RuO_2$ films before the Faradaic processes that yield electrochemically deposited Pt nanoparticles can occur. It was found that 20-s deposition intervals (total charging+deposition time) yield $RuO_2$(Ti) foils with a bimodal size distribution of deposited Pt nanoparticles, comprising one population of ~2-nm particles and a second population of particles ~4-5-nm in diameter, as seen by scanning electron microscopy for Pt/$RuO_2$(Ti)-1 (FIG. 1).

Example 3

Structural Characterization

The morphology of the Pt/$RuO_2$ films was examined by scanning electron microscopy (SEM, Leo Supra 55 scanning electron microscope) using an accelerating voltage of 20 kV and 30-μm aperture. The platinum content in two Pt/$RuO_2$ films was determined by ICP-MS (Galbraith Laboratories, Knoxville, Tenn.).

Figure 2:
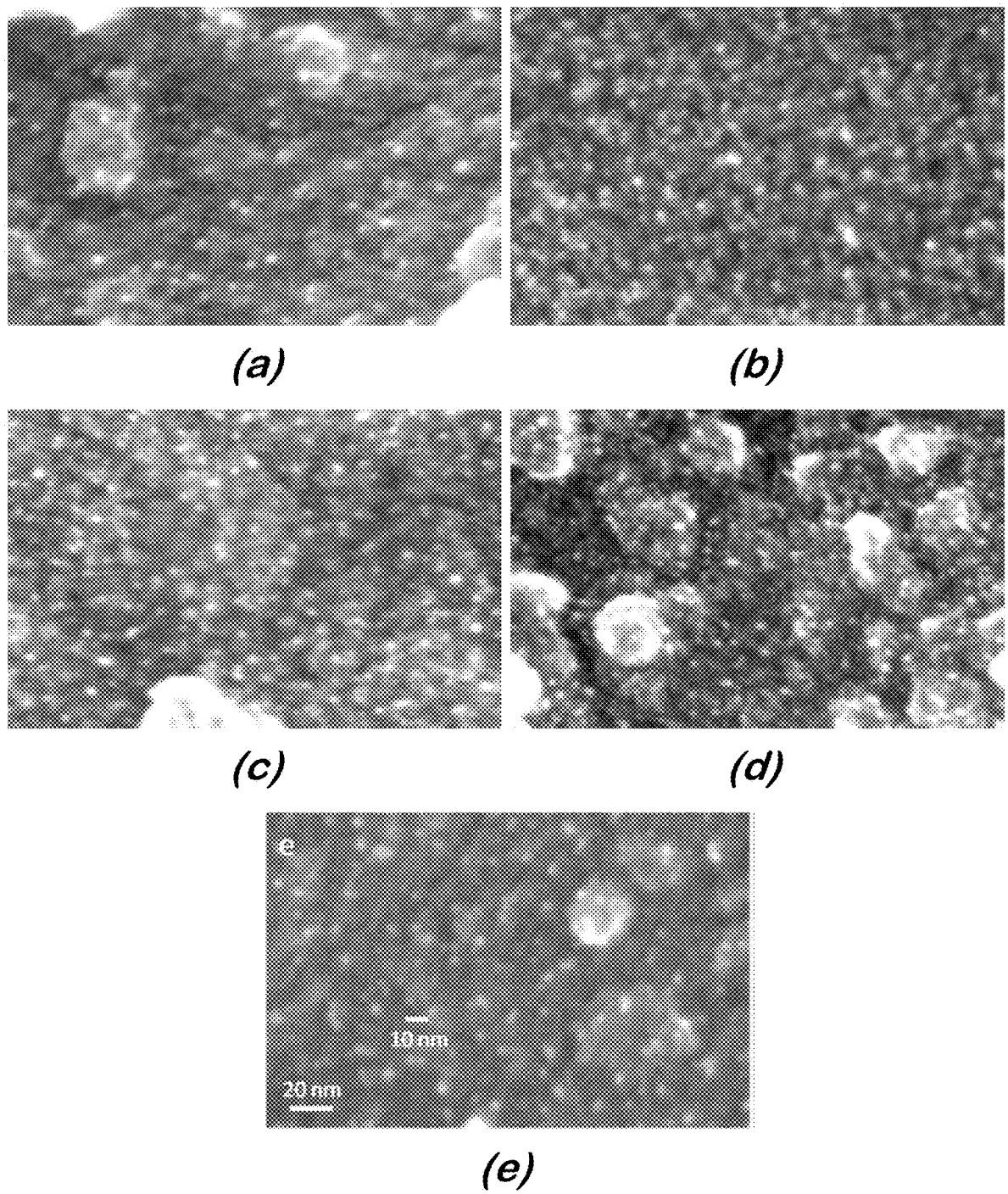
FIG. 2 shows scanning electron micrographs of Pt supported at $RuO_2$ nanoskins supported on Ti foil to explore batch-to-batch variation. a. Pt/RuO₂(Ti)-4; b. Pt/RuO₂(Ti)-6; c. Pt/RuO₂(Ti)-7; d. Pt/RuO₂(Ti)-8; e. Pt/RuO₂(Ti)-5 (three layers of nanometric $RuO_2$ are electrolessly deposited sequentially at the Ti substrate before electrodeposition of Pt nanoparticles); see Table 1 for the electrochemical data derived for these specimens.

Batch-to-batch variation of the size distribution of Pt nanoparticles for four additional Pt/$RuO_2$(Ti) samples is shown in FIG. 2. The surface morphology as seen by scanning electron microscopy for Pt/$RuO_2$(Ti) foil #4 (Pt/$RuO_2$(Ti)-4) exhibits a sparse coverage of electrodeposited Pt nanoparticles (FIG. 2(a)), as described in the main text. Film Pt/$RuO_2$(Ti)-6, shown in FIG. 2(b), has a very similar apparent Pt particle size distribution to Pt/$RuO_2$(Ti)-1 (FIG. 1). Foils 1 and 6 were fabricated in parallel at each stage— i.e., $RuO_2$ was electrolessly deposited on the two Ti foils in the same reactor at the same time; Pt nanoparticles were electrodeposited consecutively at the $RuO_2$-coated Ti foils from the same $H_2PtCl_6$ electrolytic solution. Foils 7 and 8 were similarly produced in parallel and feature Pt nanoparticle coverage (scanning electron micrographs shown in FIGS. 2(c) and 2(d)) intermediate between the more dense coverage of films 1 and 6 and the more sparse coverage seen on Pt/$RuO_2$(Ti)-2 (not shown) and Pt/$RuO_2$(Ti)-4 (FIG. 2(a)). Foils 2 and 4, although similar in apparent Pt coverage, were fabricated in separate batches. The reason for the batch-to-batch variation was unclear; all of the films had very similar (±~10%) electrochemical capacitance, making differences in RC time constants for charging of the electrode interface unlikely to be the source of the differences in Pt coverage. The effect of surface morphology on electrodepositing Pt at a $RuO_2$ surface film comprising three sequentially deposited layers of $RuO_2$ nanoskin (Pt/$RuO_2$(Ti)-5; FIG. 2(e)) can be seen to be comparable to electrodeposition at the thinner, single layer $RuO_2$ nanoskins. Because the Ti foil is not atomically flat, some non-uniformity at the surface can be attributed to its texture.

Example 4

X-Ray Photoelectron Spectroscopy

The chemical state of Pt, Ru, C and O in the Pt/$RuO_2$ films was determined by X-ray photoelectron spectroscopy (XPS, Thermo Scientific K-Alpha spectrometer) using monochromatic Al—Kα radiation (1486.6 eV). All measurements had a step size of 0.15 eV and dwell time of 0.1 s. Each individual spectrum was recorded in fixed analyzer transmission mode with a pass energy of 20 eV and an accumulation of 10 scans. All spectra were processed and fitted with Unifit 2007 software, using the minimum number of peaks consistent with the best fit.

Figure 3:
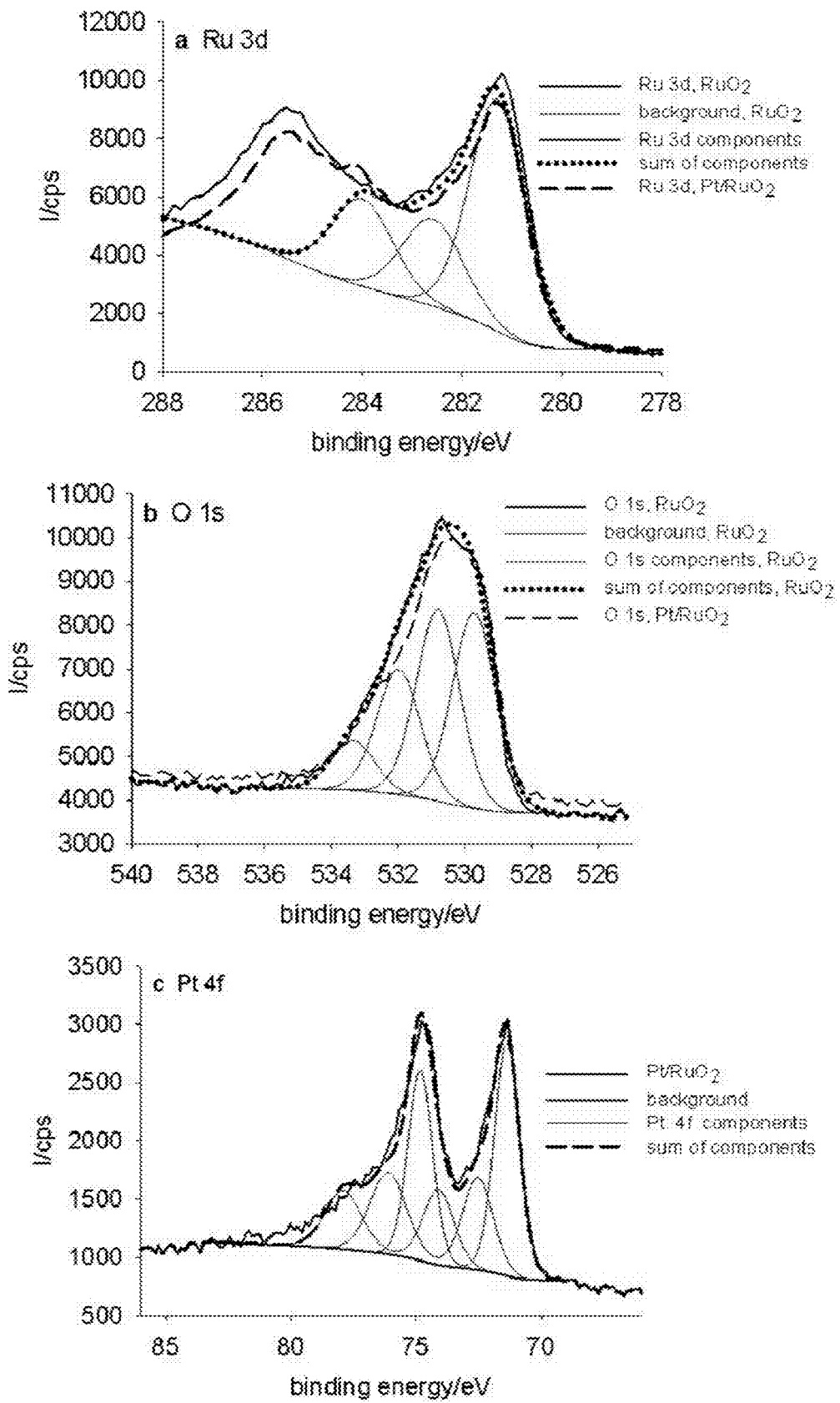
FIG. 3 shows X-ray photoelectron spectra of a RuO₂(Ti) foil before (-) and after ( - - - ) electrodeposition of Pt nanoparticles to create a Pt/RuO₂(Ti) foil. The fitted components are indicated by legends on the Figure: (a) Ru3d spectra; (b) O1s spectra; (c) Pt4f spectra.

The Ru 3d region for $RuO_2$(Ti) foils heated to 150° C. is nearly identical with or without electrodeposited Pt nanoparticles (FIG. 3(a)). The Ru $3d_{5/2}$ peak, used to assign chemical speciation of Ru, has a binding energy (BE) for both samples of 281.2 eV, which is a value closer to that for $RuO_2 \cdot xH_2O$ (281.4 eV) than that for anhydrous rutile $RuO_2$ (280.7 eV) (Kim et al., *J. Catal.* 35 (1974) 66-72). The Ru $3d_{5/2}$ BE is 0.3 eV higher than the 280.9 eV reported by Chervin (*Nano Lett.*) for $RuO_2$ nanoskins electrolessly deposited on silica fiber paper and heated to 150° C. The BE difference may derive from interfacial interactions that affect the degree of hydration of the $RuO_2$ nanoskin, especially as the surface energy likely differs between single unit-cell thick $RuO_2$ nanoskins deposited at fused $SiO_2$ versus deposition at the oxide/hydroxide passivation layer that forms at the surface of the Ti foil. As was also observed by Chervin (*J. Electroanal. Chem.*) for $RuO_2(SiO_2)$ paper, additional peaks at higher BE are observed for $RuO_2$ nanoskins on Ti. The first, fitted at ~282.6±0.1 eV, is consistent with the presence of Ru—OH bonds (Hagans et al., in: *Electrode Materials and Processes for Energy Conversion and Storage IV*, J. McBreen and S. Srinivasan (Eds.), PV 97-13, Electrochemical Society, Pennington, N.J., 1997, 86-105), which form upon exposure of $RuO_2$ nanoskins to atmospheric water (Chervin, *J. Electroanal. Chem.*). The second peak occurs around 284 eV, and represents a combination of Ru $3d_{5/2}$ shake-up transitions and adventitious carbon (Chervin, *J. Electroanal. Chem.*; Cox et al., *J. Solid State Chem.* 62 (1986) 360-370).

The O 1s spectra in FIG. 3(b) for $RuO_2$(Ti) and Pt electrodeposited at $RuO_2$(Ti) are also nearly identical. Their baseline widths are the same, but the peak for Pt/$RuO_2$(Ti) is slightly narrower near the high-energy end of the envelope, near BE values of ~532.0 eV. The two primary O 1s peaks deriving from $RuO_2$ are centered at 529.7 eV, corresponding to rutile oxygen (Chervin, *J. Electroanal. Chem.*; Crist, *The Elements and Their Native Oxides*, John Wiley & Sons, New York, 2000, p 448) and at 530.8 eV, corresponding to hydrated ruthenium oxide (Hagans). The higher energy O 1s peaks at ~532.0 eV and ~533.4 eV are due to surface —OH groups and $H_2O$ on the titanium metal support (McCafferty et al., *Appl. Surf. Sci.* 143 (1999) 92-100; McCafferty et al., *Surf. Interface Anal.* 26 (1998) 549-564; the Ti 2p region exhibits multiple titanium speciation (spectra not shown). The narrowing of the high BE end of the O 1s envelope obtained for Pt/$RuO_2$(Ti) relative to that for $RuO_2$(Ti) is likely due to partial obscuring of the underlying Ti—OH by electrodeposited Pt. The Pt 4f envelope for Pt/$RuO_2$(Ti) can be fitted with three chemical states (FIG. 3(c)); only the Pt $4f_{7/2}$ envelope will be described. The peak at 71.3 eV is due to metallic Pt; that at ~72.5 eV to $Pt(OH)_2$; and the third at 74.2 eV is consistent with speciation as Pt oxide (Moulder et al., *Handbook of X-ray Photoelectron Spectroscopy*; J. Chastain (Ed.), Perkin-Elmer Corporation, Eden Prairie, 1992, p 181).

Example 5

Electrochemical Characterization of Pt/$RuO_2$ Films

A Pt/$RuO_2$(Ti) foil was used as the working electrode in a standard three-electrode electrochemical cell comprising a Ag/AgCl reference electrode and a Pt-gauze counter electrode, with aqueous 0.1 M $HClO_4$ as the electrolyte. The Pt/$RuO_2$ films were cycled between 0.05 V and 1.2 V vs. RHE at least 40× at a rate of 200 mV s$^{-1}$, until the voltammograms no longer changed on consecutive cycles. The Pt/$RuO_2$ surface electrochemical processes were characterized by cyclic voltammetry at 10 mV s$^{-1}$ in Ar-saturated electrolyte.

The cyclic voltammetric response of $RuO_2$(Ti) in aqueous 0.1 M $HClO_4$ (FIG. 4) is qualitatively identical to that obtained for $RuO_2$ nanoskins deposited on $SiO_2$ papers in aqueous 0.5M $H_2SO_4$ (Chervin, *Nano Lett.*; Chervin, *J. Electroanal. Chem.*). The voltammogram is highly capacitive and essentially featureless. Such voltammetry is characteristic of the electrochemical pseudocapacitance associated with hydrous $RuO_2$, in which a double insertion and de-insertion of electrons and protons into and out of the $RuO_2$ surface sites occurs (Conway, *Electrochemical Supercapacitors: Scientific Fundamentals and Technological Applications*; Kluwer Academic: New York, 1999). At potentials negative of 0.4 V, pronounced cathodic currents arise, which may be a blend of hydrogen evolution and reduction of the nanometric $RuO_2$. The corresponding anodic discharging that occurs at higher potentials concurrently with the anodic pseudocapacitance is consistent with $RuO_2$ (Hadzi-Jordanov et al., *J. Electrochem. Soc.* 125 (1978) 1471-1480; Ardizzone et al., *J. Electroanal. Chem.* 266 (1989) 191-195).

Figure 4:
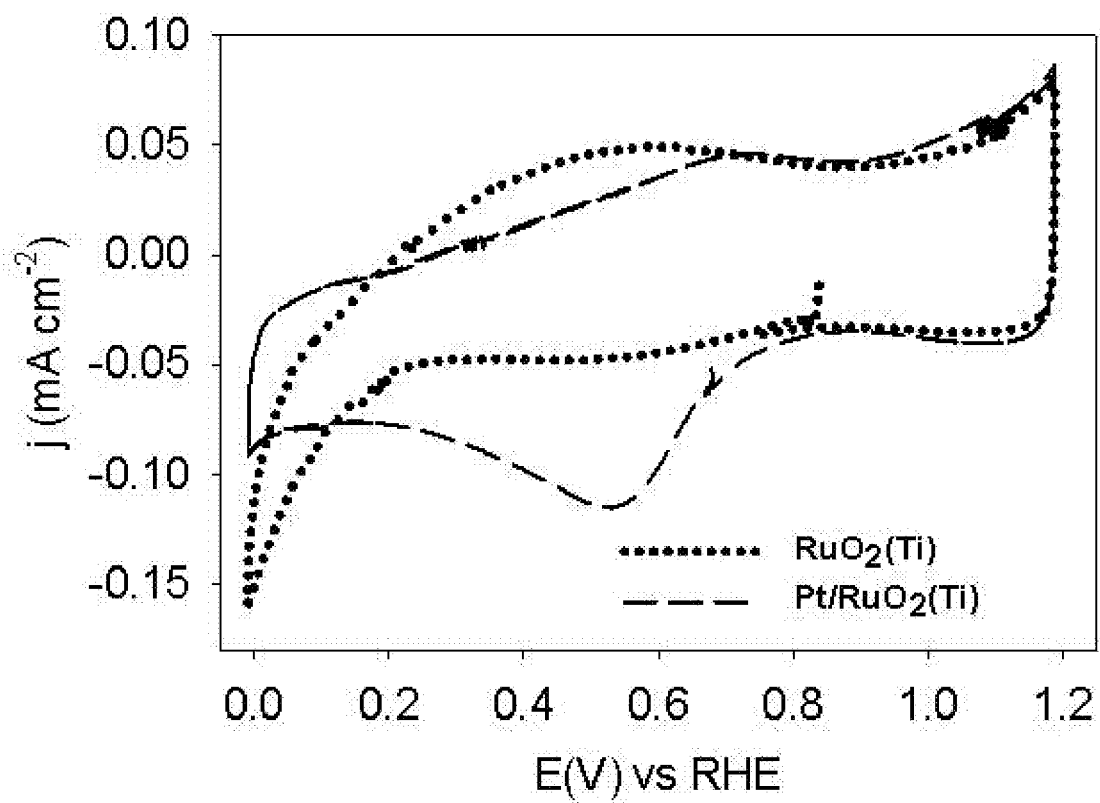
FIG. 4 shows cyclic voltammetric traces for RuO₂(Ti) (●●●) and Pt/RuO₂(Ti) ( - - - ) in 0.1 M $HClO_4$ at 10 mV $s^{-1}$. The current densities are normalized to the geometric surface area of the foils.

The cyclic voltammetric trace for $Pt/RuO_2(Ti)$ is a convolution of the i-V curves typically observed for Pt nanoparticles in 0.1 M $HClO_4$ (Gasteiger et al., *Appl. Catal. B: Environ.* 56, (2005) 9-35) with the i-V curve obtained for Pt-free $RuO_2(Ti)$ foils (FIG. 4). The initiation of Pt oxidation is difficult to discern at $Pt/RuO_2(Ti)$—it may begin at potentials as low as ~0.22 V and is certainly underway by 0.3 V. Platinum oxide must form because stripping of the oxide was observed initiating at ~0.8 V with a peak at 0.54 V. The cathodic feature observed for the $RuO_2$ nanoskin at potentials below ~0.2 V is absent in the i-V trace for the $Pt/RuO_2$ film. Consequently, the corresponding anodic current in the pseudocapacitive region decreases during the forward-going scan. The reason for the absence of these electrochemical processes on $Pt/RuO_2(Ti)$ is presently unclear. At potentials above ~0.8 V, the i-V curves for $Pt/RuO_2(Ti)$ and $RuO_2(Ti)$ electrodes trace each other nearly exactly.

Example 6

Determination of Pt Surface Area on $Pt/RuO_2$ Using Underpotential Deposition of Copper While voltammetric stripping of adsorbed CO is often used to estimate the microscopic surface area of Pt, subtraction of currents not associated with CO oxidation can be imprecise. Weaver et al. (*J. Electroanal. Chem.* 327 (1992) 247-260) describe factors that contribute to inaccurate background subtraction, including substantial changes in the double-layer capacitance of the electrode during desorptive oxidation of CO, which can lead to overestimation of the electrochemical surface area. Given these uncertainties, the large capacitive background established by the nanometric $RuO_2$, and the broad distribution of oxidation potentials observed for CO on $Pt/RuO_2$ (vide infra), accurate subtraction of the CO-free i-V background is unlikely. Instead the stripping of underpotential-deposited copper ($Cu_{UPD}$) was used to determine the Pt electrochemical surface area (Pt ECSA) of $Pt/RuO_2(Ti)$.

Underpotential deposition of copper ($Cu_{UPD}$) on Pt and its subsequent anodic stripping were performed to determine the Pt electrochemical surface area as follows: a $Pt/RuO_2(Ti)$ foil was immersed in aqueous 0.5 mM $CuSO_4$/0.1 M $H_2SO_4$ at the non-depositing potential of 0.95 V. Next, a UPD potential of 0.28 V was applied for 120 s, and was immediately followed with a potential sweep from 0.28 V to 1.0 V at 100 mV $s^{-1}$ to strip off the UPD Cu. After multiple voltammetric cleaning cycles (0.05 V-1.20 V at 200 mV $s^{-1}$) in Cu-free electrolyte to remove any residual Cu, the same potential step/potential cycle protocol was repeated in Cu-free electrolyte. The i-V curve obtained in Cu-free electrolyte was subtracted from that obtained in 0.5 mM $CuSO_4$/0.1 M $H_2SO_4$, resulting in a background-subtracted i-V curve clearly showing the electrochemical $Cu_{UPD}$ features.

Figure 5:
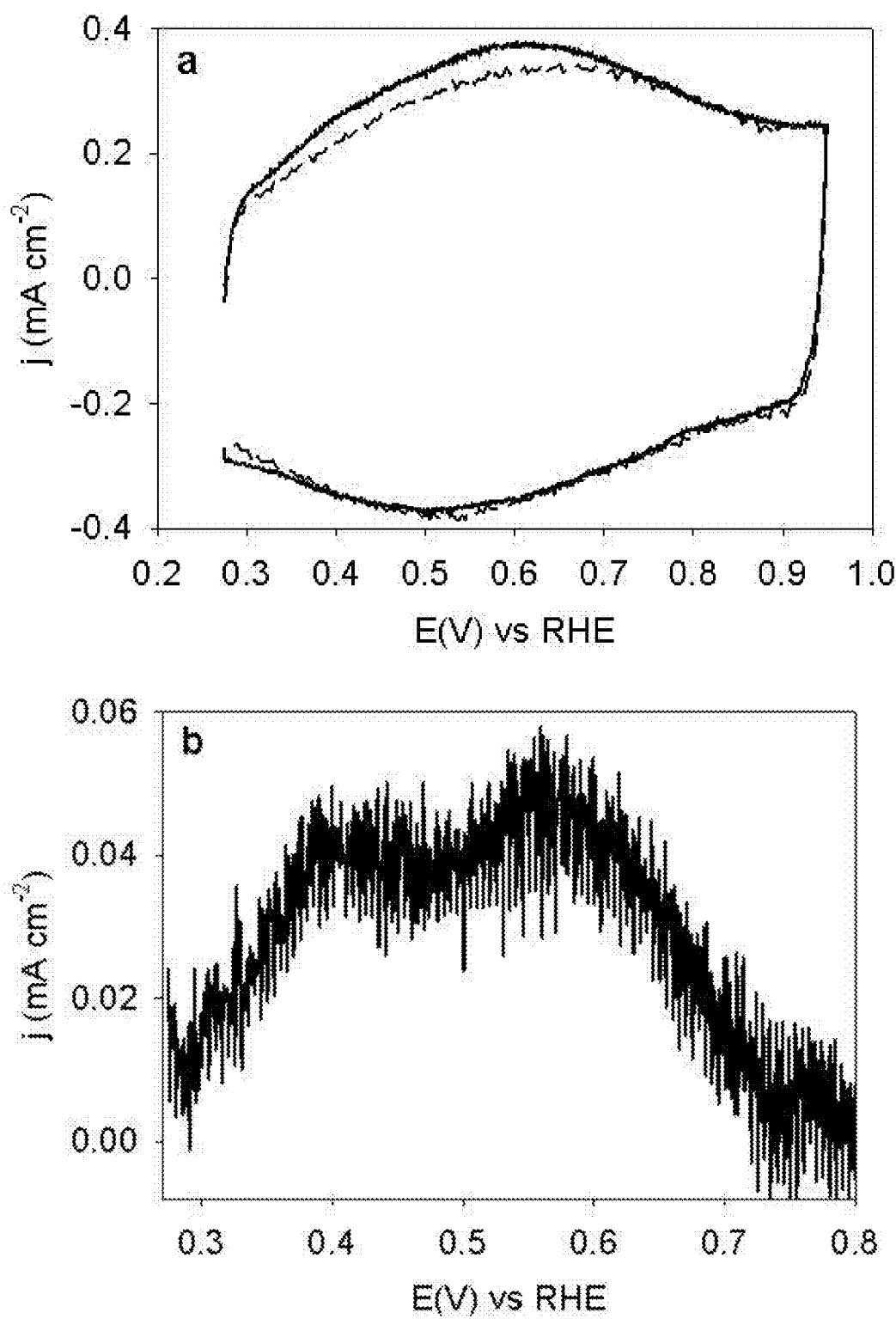
FIG. 5 shows cyclic voltammetric i-V curves showing electrochemical stripping of Cu from Pt/RuO₂(Ti) foils: (a) Pt/RuO₂(Ti) in 0.5 mM $CuSO_4$/0.1 M $H_2SO_4$ (-) after holding the potential at 0.28 V for 120 s to effect Cu UPD, and in Ar-saturated 0.1 M $H_2SO_4$ ( - - - ) taken at 100 mV $s^{-1}$; (b) Background-subtracted result of (a). The current densities are normalized to the geometric surface areas of the foils.

Green et al. (*J. Phys. Chem. B* 106 (2002) 1036-1047) demonstrated the effectiveness of using $Cu_{UPD}$ stripping to determine ECSA of high-surface-area Pt, Ru, and PtRu electrodes. Per their methods with some minor modifications to accommodate the large $RuO_2$-imposed pseudocapacitance, Cu was deposited from a $CuSO_4$ solution at 0.28 V and then applied a potential sweep to strip off (oxidize) the UPD Cu; these procedures were repeated in Cu-free electrolyte to enable subtraction of the large pseudocapacitive background. A clear separation of the i-V curve for Cu stripping from the capacitive background is observed on the positive-going scan between 0.3 V-0.7 V (FIG. 5(a)). The background-subtracted anodic Cu stripping wave (FIG. 5(b)) is nearly identical in shape to the $Cu_{UPD}$ wave obtained on nanostructured Pt black (Green). In the example shown in FIG. 5, a Pt microscopic surface area of 2 $cm^2$ was determined for electrode $Pt/RuO_2(Ti)$-2 (macroscopic area of 3.5×1 $cm^2$×2=7 $cm^2$ for the 2-sided electrode) using a normalized charged density of 420 $\mu C$ $cm^{-2}$ for the two-electron oxidative stripping of $Cu_{UPD}$ (Green).

One difference between the appearance of the voltammogram for $Pt/RuO_2(Ti)$ versus that for Pt black (Green) is the absence of the obvious cathodic wave at $Pt/RuO_2(Ti)$ foil, which indicates that re-deposition of $Cu_{UPD}$ on the $Pt/RuO_2(Ti)$ foil does not occur on the timescale of the experiment. This difference arises for interrelated reasons: Kucernak and Green perform the experiment at 10 mV $s^{-1}$, while here it was performed at 100 mV $s^{-1}$ to ensure superimposition of sharp Cu stripping waves atop the large capacitive response at $Pt/RuO_2(Ti)$. The $Cu_{UPD}$ process is slow (Green), and the tenfold shorter timescale in the experiment does not allow measurable $Cu_{UPD}$ to occur. The large pseudocapacitance added to the voltammetric response by the $RuO_2$ nanoskin and its associated RC time constant exacerbates the same problem—while stripping of $Cu_{UPD}$ is fast enough to respond to the slight lag between the actual interfacial potential and the programmed potential, the deposition process is too slow to be electrochemically measured.

Example 7

Measurement of the Electrochemical Oxidation of CO on $Pt/RuO_2(Ti)$

Electrochemical carbon monoxide stripping was performed as follows: a $Pt/RuO_2(Ti)$ foil was immersed in aqueous 0.1 M $HClO_4$ and its potential was held at 0.2 V vs. RHE while bubbling CO into the electrolyte through a medium-porosity glass frit; the electrolyte was then sparged with Ar for 30 min while maintaining the working electrode potential at 0.2 V. A potential sweep was executed at 50 mV $s^{-1}$ from 0.2 V→1.1 V→0.2 V. The resulting current-potential curve was compared to one obtained using the same potential cycle without the CO dosing step to determine the Faradaic current arising from oxidative stripping of CO from Pt in the $Pt/RuO_2$ film.

The electrochemical oxidation of adsorbed CO is a model reaction for studying catalytic oxidation on Pt nanoparticle electrocatalysts as a function of Pt particle size (Arenz et al., *J. Am. Chem. Soc.* 127 (2005) 6819-6829). Carbon monoxide oxidation is also used to investigate the promotional effects of Ru in PtRu nanoparticle electrocatalysts (Godi et al., *J. Phys. Chem. C* 113 (2009) 8518-8528; Schmidt et al., *J. Electrochem. Soc.* 145 (1998) 925-931), as well as that of hydrated or hydrous RuO$_2$ toward electrocatalytic oxidation at ruthenium oxide-supported Pt nanoparticles (Villullas, *Chem. Mater.*; Ma et al., *J. Catal.* 275 (2010) 34-44; Cao et al., *Angew. Chem. Int. Ed.* 45 (2006) 5315-5319). The electrochemical oxidation of CO adsorbed at Pt nanoparticles presumably obeys the Langmuir-Hinshelwood reaction mechanism (Arenz), as proposed elsewhere for Pt surfaces (Marković et al., *J. Phys. Chem. B* 103 (1999) 487-495; Marković et al., *Surf. Sci. Rep.* 45 (2002) 117-229)).

$$2H_2O \rightarrow OH_{ads} + H_3O^+ + e^- \quad (1)$$

$$CO_{ad} + OH_{ads} \rightarrow CO_2 + H^+ + e^- \quad (2)$$

Figure 6:
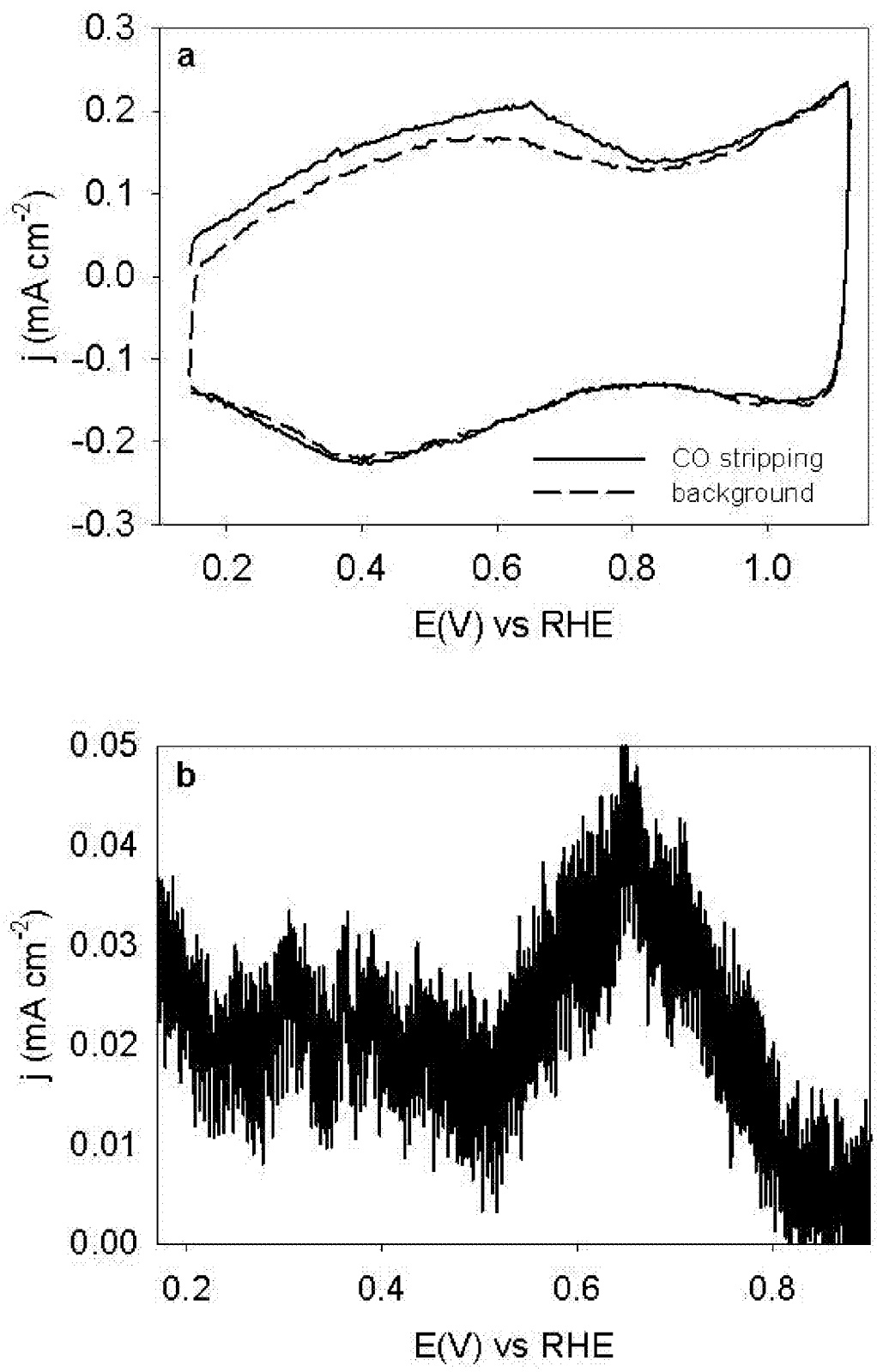
FIG. 6 shows cyclic voltammetric i-V curves showing electrochemical stripping of CO from Pt/RuO₂(Ti) foils: (a) Pt/RuO₂(Ti) in CO-saturated 0.1 M $HClO_4$ (-) and in Ar-saturated 0.1 M $HClO_4$ ( - - - ) taken at 50 mV $s^{-1}$; (b) background-subtracted result of (a). The current densities are normalized to the geometric area of the foils

The i-V curve for voltammetric stripping of CO adsorbed at Pt/RuO$_2$(Ti)-2 and the background response of Pt/RuO$_2$(Ti)-2 without adsorbed CO both feature large pseudocapacitive charging envelopes, making it difficult to discern the CO oxidation waves directly (FIG. 6(a)). The background-subtracted result (FIG. 6(b)) shows two desorption regions: one between 0.2-0.5 V and a second between ~0.55-0.75 V. The noisy signal derives from subtraction of the large pseudocapacitance from the much smaller CO stripping current. The feature between ~0.2-0.5 V is consistent with potentials for oxidative desorption of CO from Pt-on-Ru nanoparticle catalysts (Du et al., *Phys. Chem. Chem. Phys.* 11 (2009) 8231-8239), PtRu nanoparticle catalysts (Godi; Schmidt), and for small Pt nanoparticles supported on hydrous ruthenium oxide (~2.7 nm Pt) (Ma) or hydrated RuO$_2$ (~2.4 nm Pt) (Cao), indicating a strong interaction between the hydrated RuO$_2$ nanoskin and some of the deposited Pt nanoparticles.

In general, promotion of catalysis at metal nanoparticles by metal-oxide supports occurs at or near the metal-support boundary (Hayek et al., *Appl. Catal. A* 162 (1997) 1-15; Stakheev et al., *Appl. Catal. A* 188 (1999) 3-35); it is thus inferred that CO oxidation in the ~0.3-0.5 V potential window occurs on the smaller (~2 nm) Pt particles and possibly on the outer perimeter of the larger Pt particles at the RuO$_2$//Pt interface. Electrochemical oxidation of CO between ~0.55-0.75 V is consistent with the oxidation of CO bound to the surfaces of carbon-supported Pt particles in the ~2-5 nm range (Arenz; Schmidt). This CO oxidation potential is still more negative than that observed on bulk Pt (Marković, *Surf. Sci. Rep.*), and in the present case likely corresponds to the oxidation of CO bound to ~4-5-nm Pt particles on the nanometric RuO$_2$ interface.

Example 8

Electrochemical Oxidation of Methanol at Pt/RuO$_2$(Ti)

Figure 7:
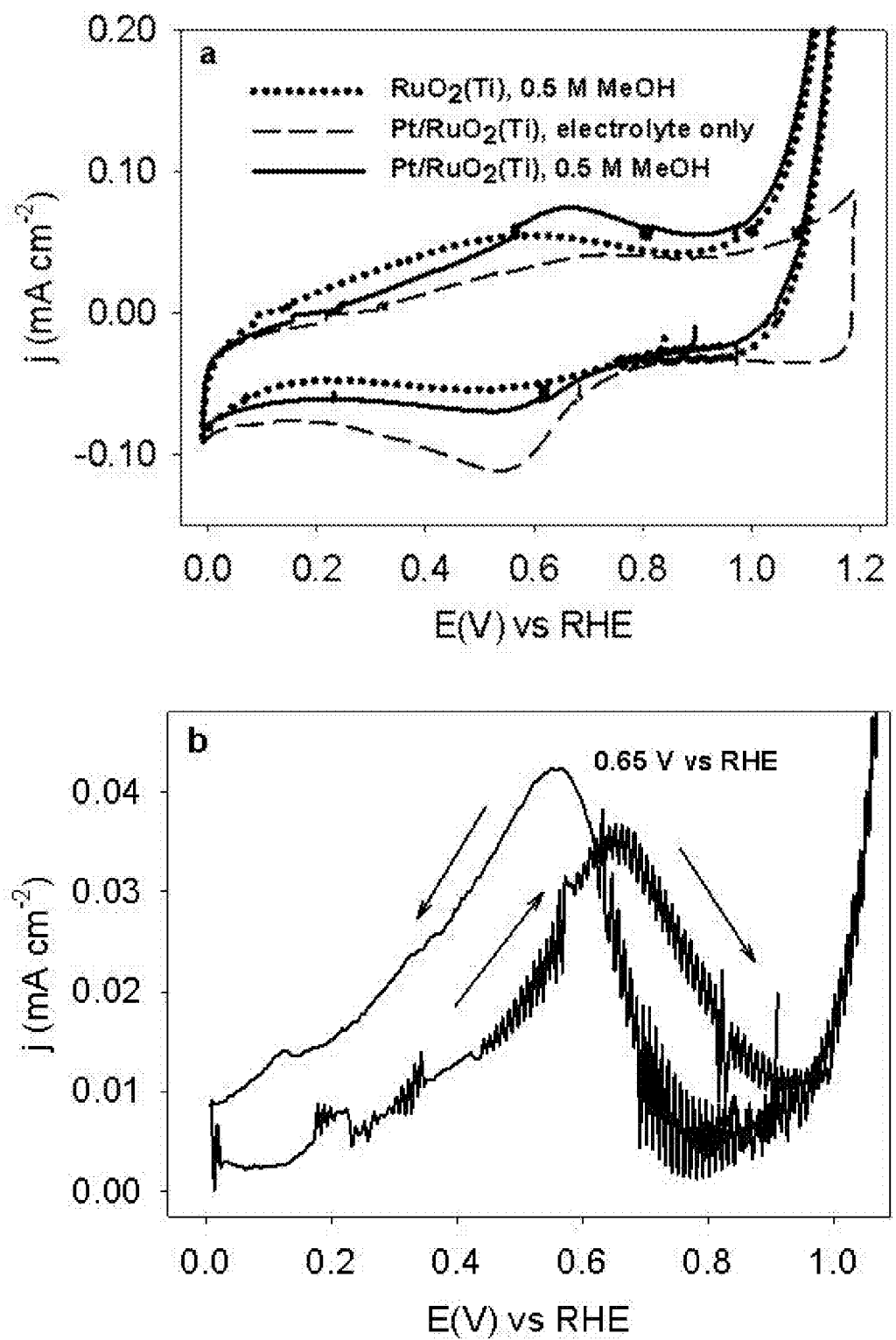
FIG. 7 shows cyclic voltammetric traces showing electrochemical oxidation of $CH_3OH$ at RuO₂(Ti) and Pt/RuO₂

To measure electrocatalytic CH$_3$OH oxidation on Pt/RuO$_2$(Ti), cyclic voltammograms were run at 10 m V s$^{-1}$ with a Pt/RuO$_2$(Ti) foil immersed in aqueous 0.5M CH$_3$OH/0.1M HClO$_4$. An anodic peak at 0.68 V, corresponding to the electrooxidation of CH$_3$OH at Pt/RuO$_2$(Ti) in 0.1 M HClO$_4$ is well resolved from the background i-V curve for both Pt/RuO$_2$(Ti) and RuO$_2$(Ti) electrodes in MeOH-free 0.1 M HClO$_4$ (FIG. 7(a)). Subtraction of the large capacitive background of Pt/RuO$_2$(Ti) in electrolyte alone yields an i-V curve for Pt/RuO$_2$(Ti) in 0.5 M CH$_3$OH/0.1 M HClO$_4$ with the usual hysteresis characteristic of electro-oxidation of CH$_3$OH on Pt catalysts in acid electrolytes (FIG. 7(b)). The anodic current reaches a maximum at peak potential E$_{p,a}$, when formation of strongly bound Pt oxides inhibits dissociation of water critical to enabling bifunctional oxidation of adsorbed CH$_3$OH (or its adsorbed dehydrogenated products such as CO; Eqs. 2 and 3) (Tripković et al., *Electrochim. Acta* 47 (2002) 3707-3714). On the return scan to more negative potential, these non-reactive oxides are reductively removed and remaining intermediates such as CO as well as freshly adsorbed CH$_3$OH can again be oxidized by reactive OH$_{ads}$ (Eqs. 2 and 3), resulting in another anodic peak at more negative potentials.

$$CH_3OH + H_2O \rightarrow CO_2 + 6H^+ + 6e^- \quad (3)$$

The electrooxidation of CH$_3$OH at Pt/RuO$_2$(Ti) initiates at ~0.24 V, as evidenced by the separation of the i-V curves corresponding to Pt/RuO$_2$(Ti) in CH$_3$OH/0.1 M HClO$_4$ and in electrolyte only. This result is consistent with onset potentials of ~0.3 V for electrochemical oxidation of CH$_3$OH on PtRu electrocatalysts in 0.5 M H$_2$SO$_4$ (Tripković) and on Pt supported on sol-gel-derived RuO$_2$ in 1.0 M HClO$_4$ (Villullas, *J. Phys. Chem. B*; Villullas, *Chem. Mater.*), because the tenfold lower acid concentration used in this study shifts the value negatively by 59 mV (Bard et al., *Electrochemical Methods: Fundamentals and Applications*, 2nd ed.; Wiley: New York, 2001, pp. 51-53). The value of E$_{p,a}$ for CH$_3$OH electrooxidation at this particular Pt/RuO$_2$(Ti) electrode is 0.65 V, as highlighted in FIG. 7(b). Adjusting by +59 mV for acid concentration as described above, the normalized value of E$_{p,a}$ of 0.71 V lies between the values of E$_{p,a}$=0.72 V reported for CH$_3$OH electrooxidation on Pt supported on sol-gel-derived RuO$_2$ in 1 M HClO$_4$ (Villullas, *J. Phys. Chem. B*) or 0.5 M H$_2$SO$_4$ (Suffredini, *Electrochem. Commun.*) and of E$_{p,a}$=0.70 V for CH$_3$OH oxidation in 0.5 M H$_2$SO$_4$ at Pt/RuO$_2$ derived from thermal deposition of polymeric precursors and featuring a hydrated form of RuO$_2$ (Profeti). Finally, the oxidation of CH$_3$OH at RuO$_2$ nanoskins, with or without Pt, initiates at ~0.9 V (FIG. 7(a)). Note that it was necessary to perform the CH$_3$OH oxidation experiments in 0.1 N acid because, although the capacitance envelope was unchanged, the CH$_3$OH oxidation activity was suppressed in 1 N acid for reasons that are presently unclear.

The peak potentials for CH$_3$OH electrooxidation at five different Pt/RuO$_2$(Ti) electrodes derived from both background-subtracted and uncorrected cyclic voltammograms are given in Table 1. With some exceptions, the values of E$_{p,a}$ taken from background-subtracted data are 30-70 mV negative of the values taken from the uncorrected data. While it is not common practice to background-subtract cyclic voltammograms for CH$_3$OH electrooxidation on Pt, Pt—RuO$_2$ or PtRu catalysts, the pseudocapacitive backgrounds for Pt/RuO$_2$(Ti) electrodes are sloping and large compared to the Faradaic response for CH$_3$OH oxidation, and thus affect the apparent value of E$_{p,a}$. It is unclear presently whether the background subtraction captures E$_{p,a}$ more accurately or distorts its value, therefore both data sets are presented.

TABLE 1

Peak potentials and current densities for electrooxidation of CH$_3$OH on Pt/RuO$_2$(Ti) foils as measured by cyclic voltammetry performed at 10 mV s$^{-1}$

| Pt/RuO$_2$(Ti)-# Foil # | E$_{p,a}$ (V vs. RHE) | E$_{p,a}$ subtracted (V vs. RHE) | j$_{p,EC}$ (mA cm$^{-2}$)* | i$_{p,m}$ (A g$_{Pt}^{-1}$)** |
|---|---|---|---|---|
| 1 | 0.68 | 0.65 | — | — |
| 2 | 0.62 | 0.63 | 0.15 | 83 |

TABLE 1-continued

Peak potentials and current densities for electrooxidation of
$CH_3OH$ on $Pt/RuO_2(Ti)$ foils as measured by
cyclic voltammetry performed at 10 mV s$^{-1}$

| Pt/RuO$_2$(Ti)-# Foil # | E$_{p,a}$ (V vs. RHE) | E$_{p,a}$ subtracted (V vs. RHE) | j$_{p,EC}$ (mA cm$^{-2}$)* | i$_{p,m}$ (A g$_{Pt}^{-1}$)** |
|---|---|---|---|---|
| 3 | 0.68 | 0.68 | 0.28 | 125 |
| 4 (one-sided film) | 0.63 | 0.60 | — | — |
| 5 three-layer film | 0.64 | 0.62 | 0.19-0.28 | — |
| 6 | 0.67 | 0.62 | — | — |
| 7 | 0.67 | 0.61 | — | — |
| 8 | 0.66 | 0.59 | — | — |
| 9 | 0.65 | 0.61 | — | — |
| 10 | 0.68 | 0.67 | — | — |

*Normalized to the electrochemical surface area of Pt in the film
**Normalized to the Pt mass in the film
—Indicates the quantity was not measured The subtracted values of $E_{p,a}$ are in some cases as low as 0.59-0.60 V, which corrected for acid concentration (vide supra) are equivalent to 0.65-0.66 V in 1 N acid. These values are among the lowest reported values of $E_{p,a}$ for $CH_3OH$ electrooxidation on Pt—$RuO_2$, and are comparable to values of 0.6-0.7 V reported for PtRu alloys (Marković et al., *Electrochim. Acta* 40 (1995) 91-98). Even considering only the unmodified values, these Pt/RuO$_2$(Ti) electrodes feature $E_{p,a}$ values equivalent to the lowest reported overpotentials for electrooxidation of $CH_3OH$ on $RuO_2$-supported Pt. Two of the electrodes—Pt/RuO$_2$(Ti)-2 and Pt/RuO$_2$(Ti)-4—feature particularly low unmodified values of $E_{p,a}$, which are 0.62 V and 0.63 V, respectively, or the equivalent of 0.68 V and 0.69 V in 1 N acid.

The peak current densities (Table 1) normalized for ECSA ($j_{p,a}$) and Pt mass ($i_{p,m}$) are lower than those reported elsewhere. The values of $j_{p,a}$ for Pt/RuO$_2$(Ti) electrodes are lower by a factor of ~2-3 than those reported by Villullas et al. (*J. Phys. Chem. B; Chem. Mater.*) (0.6 mA cm$^{-2}$) for Pt nanoparticles on sol-gel-derived $RuO_2$. Suffredini et al. (*Electrochem. Commun.; J. Power Sources*, 2006, 158, 124-128) report mass-normalized currents from 150-250 A g$_{Pt}^{-1}$; values reported here are lower by a factor of ~1.5-2. These lower peak current densities at Pt/RuO$_2$(Ti) reflect a mixture of promoted $CH_3OH$ oxidation at Pt nanoparticles in the ~2-nm range, and minimal $CH_3OH$ oxidation at Pt nanoparticles in the 4-5-nm range. In other words, the two populations of Pt nanoparticles have very different catalytic activity at $E_{p,a}$. The CO oxidation data are consistent with this conclusion, in that the two CO oxidation features correspond to strongly promoted oxidation on the smaller Pt particles and possibly on the perimeter of the larger particles below ~0.6 V, with the larger Pt particles only becoming fully active at higher potentials.

The greater activity of the 2-nm Pt nanoparticles makes their preferential deposition highly desirable. Further refinement of deposition times and better control of the initial condition of the $RuO_2$ films (e.g., using plasma cleaning or strong acid treatments to eliminate organic impurities on the $RuO_2$ surface) should mitigate deposition of larger, less active Pt nanoparticles and improve current density at low overpotentials. Alternately, preformed 2-3-nm Pt nanoparticles could be electrophoretically deposited on the $RuO_2$ nanoskins by adapting the methods developed by Teranishi et al. (*J. Phys. Chem. B* 103 (1999) 3818-3827).

Example 9

Alternate Electrode Geometries—Single-Sided Pt/RuO$_2$(Ti) and Multiple Layers of Ti-Supported $RuO_2$ Nanoskins To determine the effect of electrode orientation on the electrodeposition process and electrocatalytic activity, Pt/RuO$_2$(Ti)-4 was coated with Pt on only one side. All of the other samples reported herein were coated on both sides with Pt, because the Ti foils come out of the $RuO_2$ electroless deposition step with both sides coated. Foil Pt/RuO$_2$(Ti)-4 features ~2-4-nm Pt nanoparticles attached to the $RuO_2$ film. Cyclic voltammetric polarization of Pt/RuO$_2$(Ti)-4 in 0.5 M $CH_3OH$/0.1HClO$_4$ resulted in i-V curves essentially identical to those obtained on the two-sided films (data not shown). The $E_{p,a}$ for $CH_3OH$ electrooxidation was essentially the same as that obtained on Pt/RuO$_2$(Ti)-2, a two-sided film with a similar level of Pt nanoparticle coverage and size dispersion (Table 1). This insensitivity of catalytic activity to film orientation during Pt electrodeposition may enable the development of multifunctional catalytic electrodes of more complex geometries and high surface areas.

Pt nanoparticles were also electrodeposited at $RuO_2$ nanoskins, which were deposited in multiple layers on Ti foil. Electrochemical data from Pt/RuO$_2$(Ti)-5, which features three $RuO_2$ nanoskin layers coating the Ti-foil substrate (Table 1), establish that methanol oxidation overpotentials and current densities are identical to those achieved at single-layer $RuO_2$ nanoskins. Scanning electron microscopy reveals Pt nanoparticles in the 2-4-nm range (data not shown), as seen for electrodeposited Pt at single-layer $RuO_2$ electrodes. The ability to create multilayer composite $RuO_2$(Ti) substrates lends another degree of flexibility to this fabrication method for multifunctional electrode interfaces. More importantly, it highlights the ability to accomplish state-of-the art electrocatalysis at the Pt//RuO$_2$ interface by depositing a minimum amount of $RuO_2$.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. An article comprising:
    a substrate comprising titanium, a titanium carbide, a titanium nitride, tantalum, aluminum, silicon, or stainless steel;
    a $RuO_2$ coating on a portion of the substrate;
        wherein the coating comprises nanoparticles of $RuO_2$; and
    a plurality of platinum nanoparticles on the $RuO_2$ coating;
        wherein the $RuO_2$ coating is made by a method comprising:
        immersing the substrate in a solution of $RuO_4$ and a nonpolar solvent at a temperature that is below the temperature at which $RuO_4$ decomposes to $RuO_2$ in the nonpolar solvent in the presence of the substrate; and
        warming the substrate and solution to ambient temperature under ambient conditions to cause the formation of the coating.

2. The article of claim 1, wherein the substrate comprises titanium.

3. The article of claim 1, wherein the substrate is a planar substrate or a mesh.

4. The article of claim 1, wherein the $RuO_2$ forms an electrically connected network across the substrate.

5. The article of claim 1, wherein the $RuO_2$ coating has an average thickness of up to about 9 nanometers.

6. The article of claim 1, wherein the method of making the coating further comprises:
heating the coating to a maximum temperature from 150° C. to 250° C.

7. The article of claim 1, wherein the method of making the coating further comprises:
repeating the immersing and the warming of the substrate are repeated one or more times to form more than one $RuO_2$ layer in the coating.

8. The article of claim 1, wherein the platinum nanoparticles have an average diameter less than about 5 nm.

9. The article of claim 1, wherein platinum nanoparticles are formed at the $RuO_2$ coating by electrodeposition.

10. A fuel cell comprising:
an anode comprising the article of claim 1; and
a cathode.

11. A method comprising:
oxidizing methanol at the surface of the anode of the fuel cell of claim 10.

12. A method comprising:
immersing a substrate comprising titanium, a titanium carbide, a titanium nitride, tantalum, aluminum, silicon, or stainless steel in a solution of $RuO_4$ and a nonpolar solvent at a temperature that is below the temperature at which $RuO_4$ decomposes to $RuO_2$ in the nonpolar solvent in the presence of the article;
warming the article and solution to ambient temperature under ambient conditions to cause the formation of a $RuO_2$ coating on a portion of the article; and
electrodepositing platinum nanoparticles on the $RuO_2$ coating.

13. The method of claim 12, wherein the substrate comprises titanium.

14. The method of claim 12, wherein the nonpolar solvent is a hydrocarbon.

15. The method of claim 12, wherein the nonpolar solvent is petroleum ether.

16. The method of claim 12, further comprising:
extracting the $RuO_4$ from an aqueous solution into the nonpolar solvent before immersing the article in the $RuO_4$ solution.

17. The method of claim 12, wherein the immersing temperature is maintained by a dry ice bath or aqueous ice bath.

18. The method of claim 12, further comprising:
equilibrating the article in an additional portion of the nonpolar solvent at the temperature before immersing the article in the $RuO_4$ solution.

19. The method of claim 12, further comprising:
heating the article in air or oxygen to a temperature less than 250° C.

20. The article of claim 1, wherein the plurality of platinum nanoparticles are made by electrodeposition.

* * * * *